US010063575B2

(12) United States Patent
Vasseur et al.

(10) Patent No.: US 10,063,575 B2
(45) Date of Patent: Aug. 28, 2018

(54) ANOMALY DETECTION IN A NETWORK COUPLING STATE INFORMATION WITH MACHINE LEARNING OUTPUTS

(71) Applicant: Cisco Technology, Inc., San Jose, CA (US)

(72) Inventors: Jean-Philippe Vasseur, Anchorage, AK (US); Fabien Flacher, Antony (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 14/878,166

(22) Filed: Oct. 8, 2015

(65) Prior Publication Data

US 2017/0104774 A1 Apr. 13, 2017

(51) Int. Cl.
*H04L 29/06* (2006.01)
*G06N 99/00* (2010.01)

(52) U.S. Cl.
CPC ....... *H04L 63/1425* (2013.01); *G06N 99/005* (2013.01)

(58) Field of Classification Search
CPC .................................................. H04L 63/1425
USPC .......................................................... 726/23
See application file for complete search history.

(56) References Cited

U.S. PATENT DOCUMENTS

| 6,177,885 | B1 | 1/2001 | Weil et al. | |
|---|---|---|---|---|
| 6,453,318 | B1 * | 9/2002 | Shiina | G06F 17/30371 |
| 8,332,337 | B2 | 12/2012 | Harrison et al. | |
| 2004/0059947 | A1 | 3/2004 | Lee | |
| 2010/0153316 | A1 * | 6/2010 | Duffield | G06F 21/552 706/12 |
| 2010/0153785 | A1 * | 6/2010 | Keromytis | G06F 11/08 714/38.11 |
| 2012/0216282 | A1 * | 8/2012 | Pappu | H04L 63/1425 726/23 |
| 2013/0305357 | A1 * | 11/2013 | Ayyagari | H04L 63/14 726/22 |
| 2014/0067734 | A1 * | 3/2014 | Hawkins | G06N 5/02 706/12 |
| 2015/0193696 | A1 | 7/2015 | Vasseur et al. | |
| 2015/0304349 | A1 * | 10/2015 | Bernstein | H04L 63/1425 726/22 |

(Continued)

OTHER PUBLICATIONS

Aickelin, et al., "The Danger Theory and Its Application to Artificial Immune Systems", Proceedings of the 1st International Conference on ARtificial Immune Systems (ICARIS-2002), Sep. 2002, pp. 141-148, Canterbury, UK.

(Continued)

*Primary Examiner* — Hadi S Armouche
*Assistant Examiner* — Khalil Naghdali
(74) *Attorney, Agent, or Firm* — Parker Ibrahim & Berg LLP; James M. Behmke; Stephen D. LeBarron

(57) ABSTRACT

In one embodiment, a device in a network receives an output of an anomaly detection model. The device receives state information surrounding the output of the anomaly detection model. The device determines whether the state information supports the output of the anomaly detection model. The device causes the anomaly detection model to be adjusted based on a determination that the state information does not support the output of the anomaly detection model.

19 Claims, 11 Drawing Sheets

(56) References Cited

U.S. PATENT DOCUMENTS

2016/0036844 A1* 2/2016 Kopp .................. H04L 63/1416
 726/1
2016/0253598 A1* 9/2016 Yamada .................. G06F 21/00
 706/12

OTHER PUBLICATIONS

Senior, et al., "Forward-Backward Retraining of Recurrent Neural Networks", Advances in Neural Information Processing Systems 8, NIPS, Nov. 27-30, 1995, 7 pages, Denver, CO.
Zamani, et al., A DDoS-Aware IDS Model Based on Danger Theory and Mobile Agents, 2013 Ninth International Conference on Computational Intelligence and Security, Dec. 2009, pp. 516-520, Beijing, China.

* cited by examiner

US 10,063,575 B2

ANOMALY DETECTION IN A NETWORK COUPLING STATE INFORMATION WITH MACHINE LEARNING OUTPUTS

TECHNICAL FIELD

The present disclosure relates generally to computer networks, and, more particularly, to detecting anomalies in a network by coupling state information with machine learning outputs.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
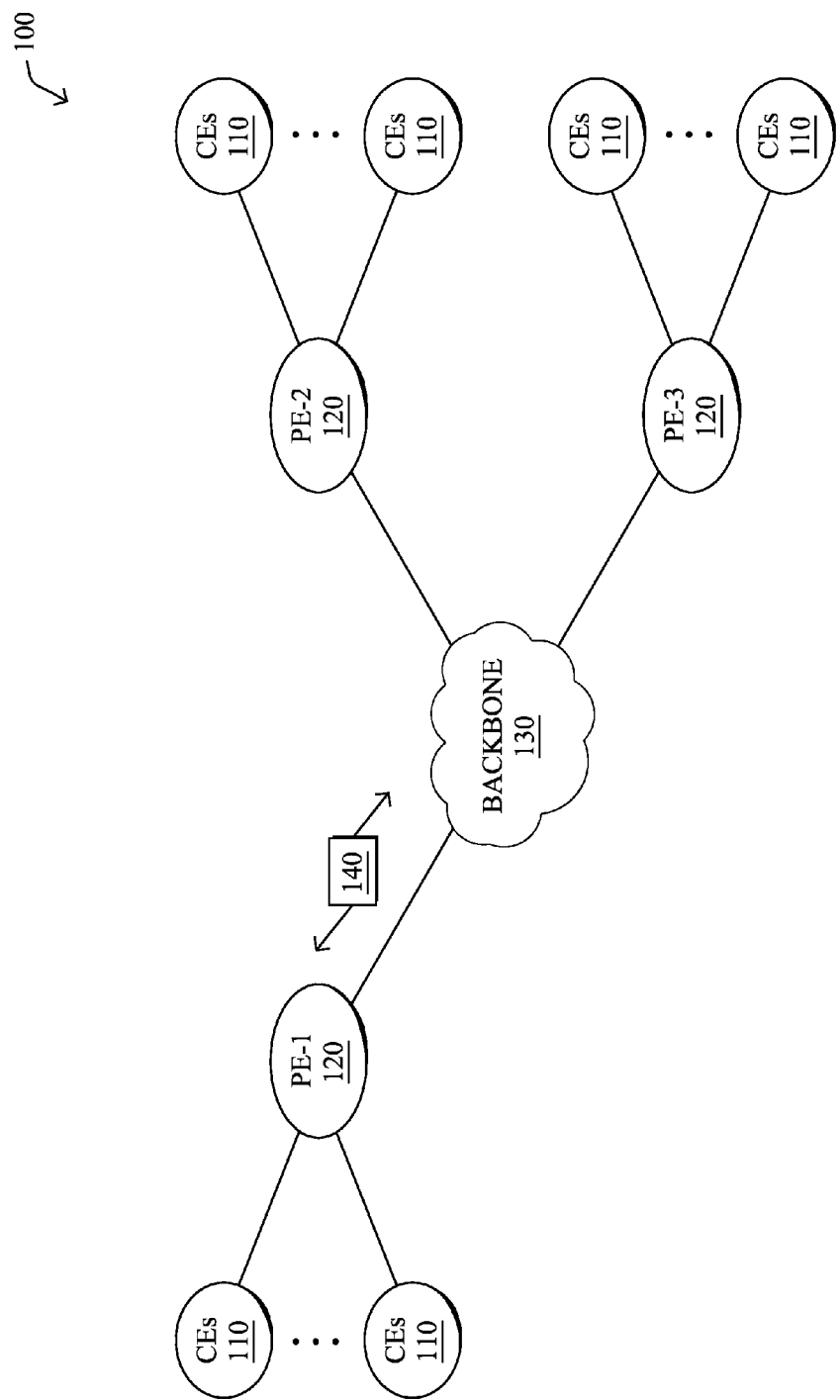
FIGS. 1A-1B illustrate an example communication network.

According to one or more embodiments of the disclosure, a device in a network receives an output of an anomaly detection model. The device receives state information surrounding the output of the anomaly detection model. The device determines whether the state information supports the output of the anomaly detection model. The device causes the anomaly detection model to be adjusted based on a determination that the state information does not support the output of the anomaly detection model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, potentially also with a wireless backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
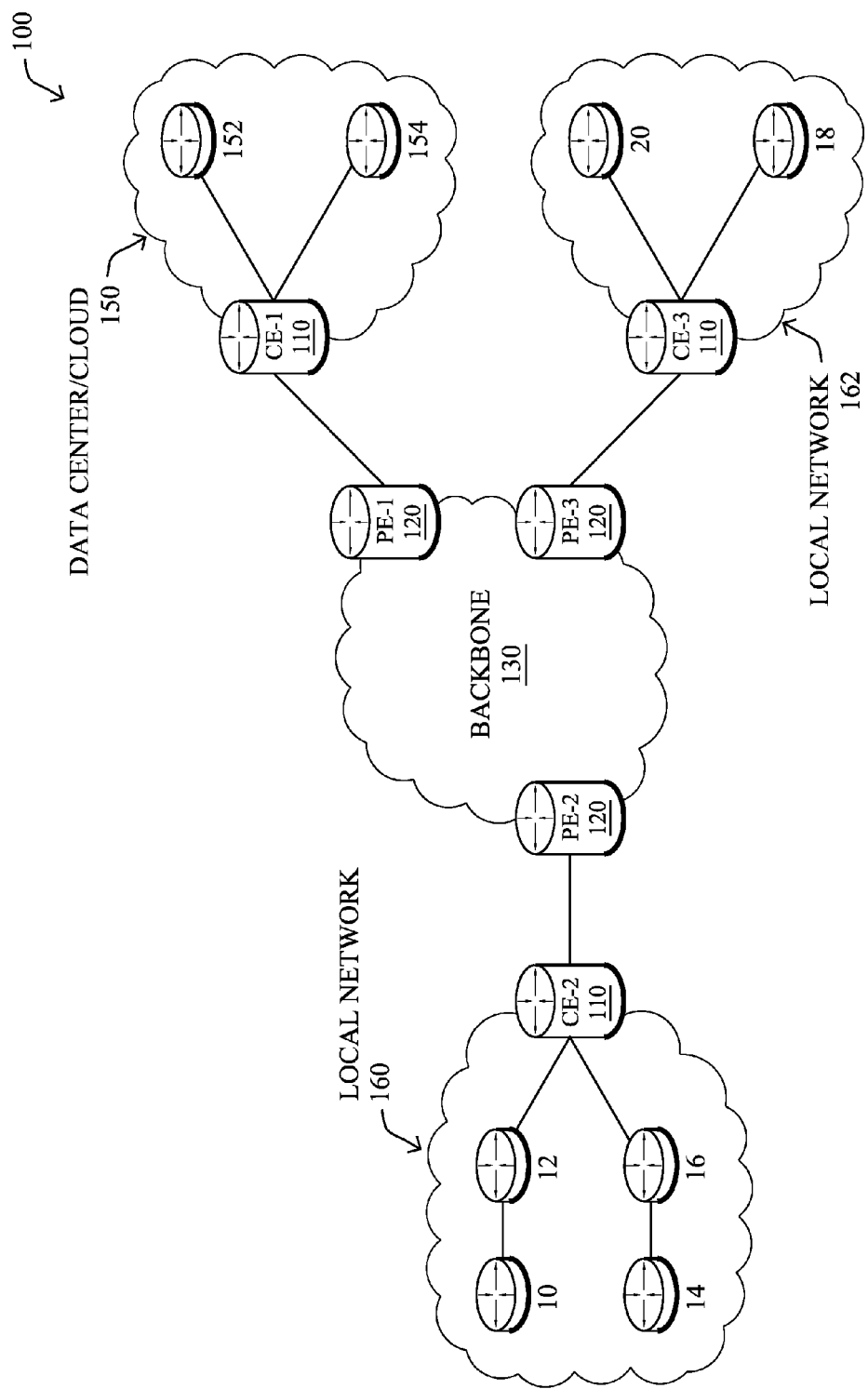

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, devices, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical devices), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
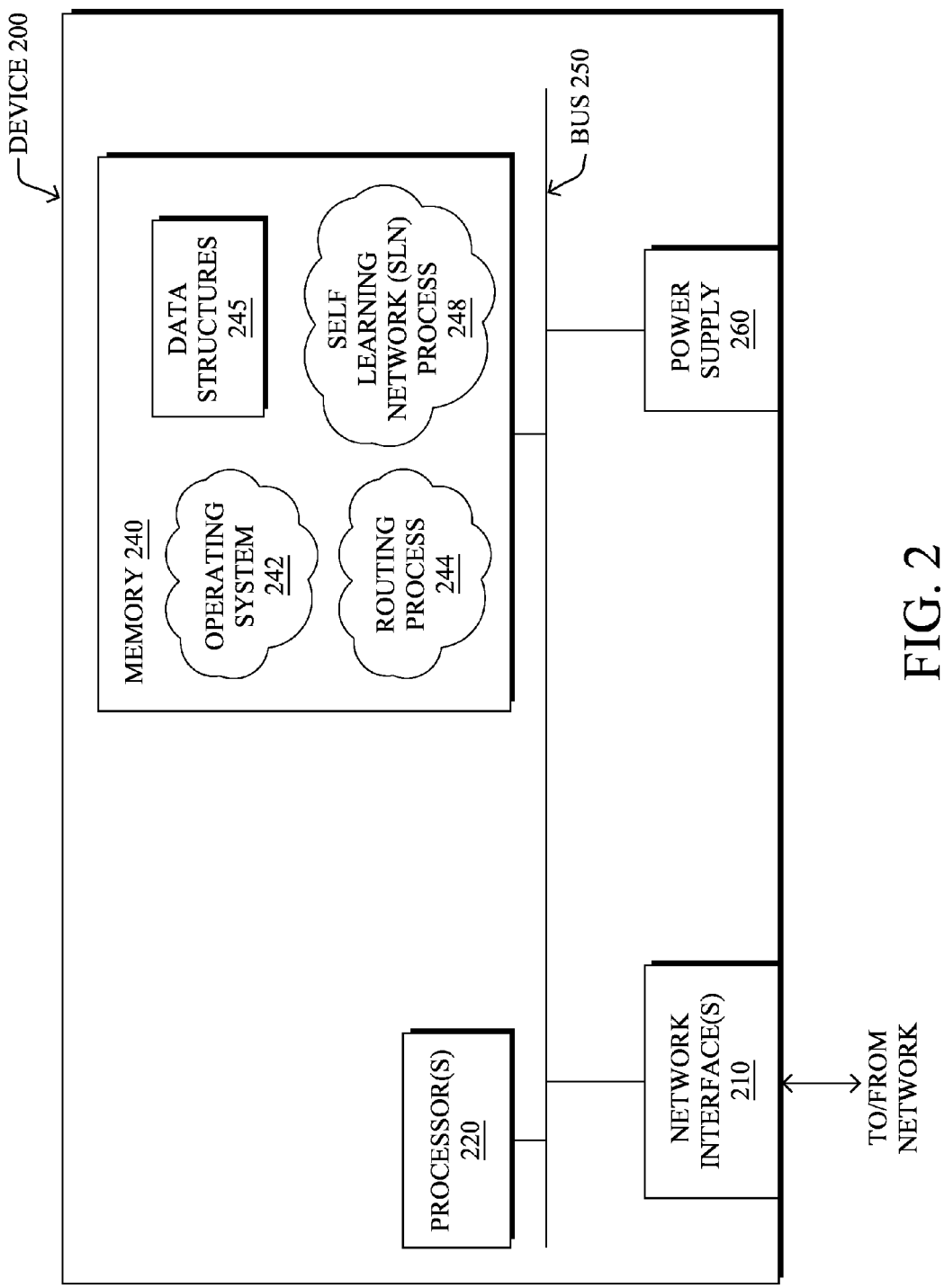
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning algorithms(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic blackhole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
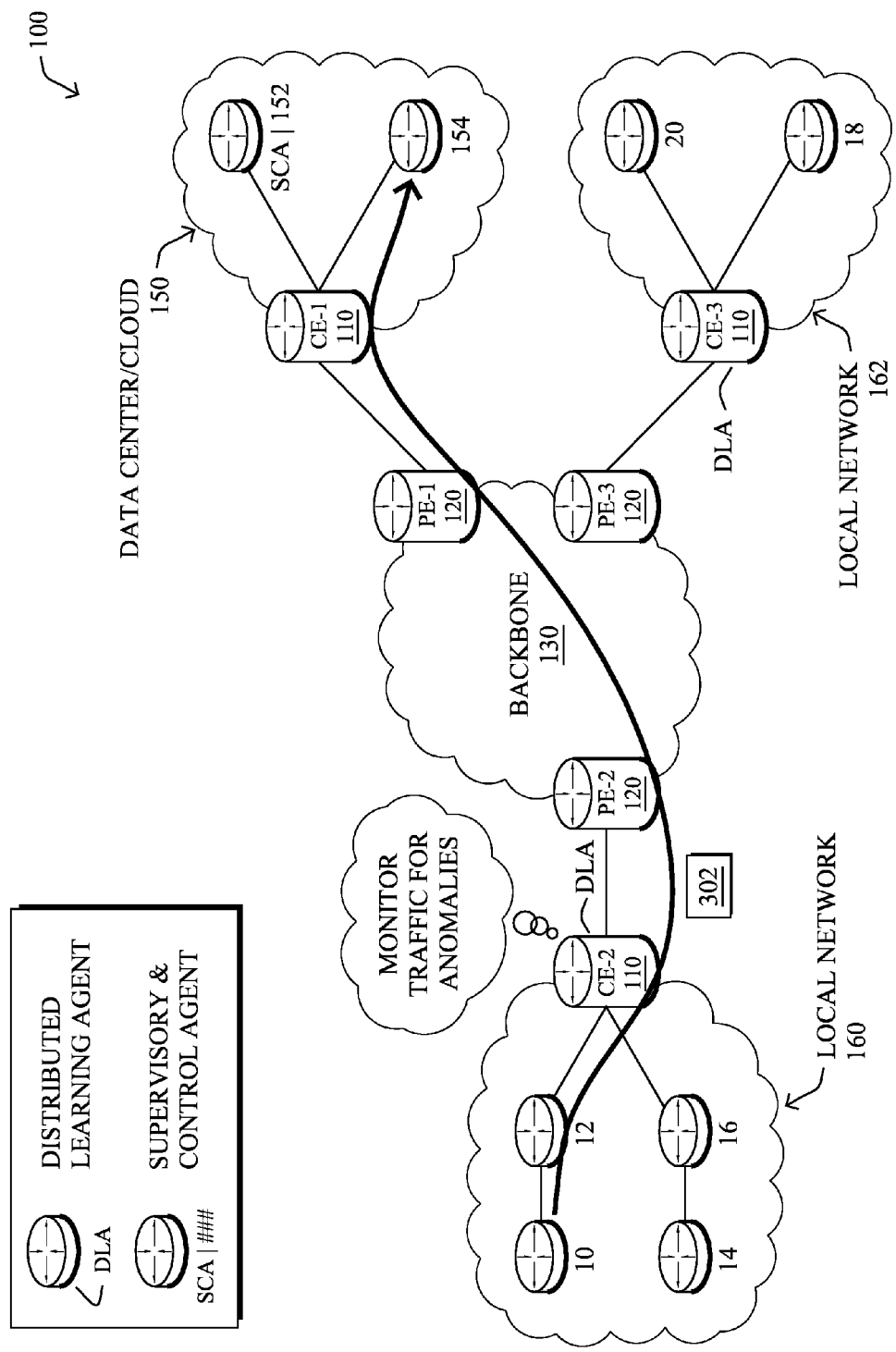
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

Anomalies such as DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of Firewall making use of static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, ANNs, deep learning, and other machine learning techniques may be used to detect potential DoS attacks and other anomalies in a network. To that end, a number of features (e.g., machine learning inputs) may be computed using aggregated traffic flow information from various sources. For example, Netflow®, of Cisco Systems, Inc., or similar mechanisms may be used to aggregate information regarding the network for analysis by an anomaly detector. In turn, a machine learning model (e.g., an ANN, etc.) may analyze the aggregated network information, to assess the probability of an anomaly/attack and potentially trigger a set of actions in response (e.g., dropping traffic, initiating traffic shaping, etc.).

While machine learning techniques have generally proven themselves to be capable of detecting DDoS attacks and other network anomalies using aggregated network information (e.g., from Netflow, etc.), the outputs of such detectors fail to take into account the network and local state information gathered locally on the devices performing the sensing. Combining this state information with records such as Netflow records may improve not only the detection rate of the detection mechanism, but can also be used to assign a severity to a detected anomaly/attack, which may not be possible otherwise. Conversely, using local states may allow for providing feedback to a central system in order to improve supervised learning, should the assessed anomaly/attack not be confirmed when not supported by the local state information. Such an approach would allow for both optimizing the supervised learning as well as identifying certain type of attacks for which the overall system may not be as effective.

Anomaly Detection in a Network Coupling State Information with Machine Learning Outputs The techniques herein allow the output from a machine learning process (e.g., a supervised anomaly detector such as an ANN) to be coupled with information regarding local network states, which may be of particular interest in LLN/IoT networks. In some aspects, techniques are described herein to retrieve state information regarding flows, performance characteristics, link congestion levels, or the like, based on one or more specified rules. In another aspect, this state information may be compared to the output of the anomaly detector, to increase the efficacy of the current detection and, later on, to increase the efficacy of the system by retraining the detector. For example, the performance of the detector may be assessed using the state information (e.g., by quantifying the detector's rate of true positives, false positives, false negatives, etc.) and may be used as feedback to the detector. Such feedback may include, e.g., the relevant extracted network data, the specific deduced label for the currently observed pattern, or the like. In a further aspect of the techniques herein, a severity for a detected anomaly may be computed according to configurable rules related to the state information and/or via dynamic learning of the severity levels, as overseen by a network administrator.

Specifically, according to one or more embodiments of the disclosure as described in detail below, a device in a network receives an output of an anomaly detection model. The device receives state information surrounding the output of the anomaly detection model. The device determines whether the state information supports the output of the anomaly detection model. The device causes the anomaly detection model to be adjusted based on a determination that the state information does not support the output of the anomaly detection model.

Illustratively, the techniques described herein may be performed by hardware, software, and/or firmware, such as in accordance with the SLN process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, a first aspect of the techniques herein allows a networking device to retrieve local and network state information from another device, when a machine learning-based anomaly detector suspects the presence of an anomaly. For example, an output of a trained ANN may indicate the presence of a DDoS attack in the network.

Referring now to FIGS. 4A-4F, examples are shown of the use of state information to confirm an output of an anomaly detection model. The state information may be retrieved in any number of different ways, depending on the source of the state information, according to various embodiments. In some embodiments, the detection device itself (e.g., the DLA) may retrieve state information locally, such as state information regarding the local state of the device or any networking state information regarding the paths or network links used by the device. For example, the DLA may utilize a programmatic interface such as OnePK or Netconf/Yang by Cisco Systems, Inc., or similar, to retrieve the relevant state information.

Figure 4A:
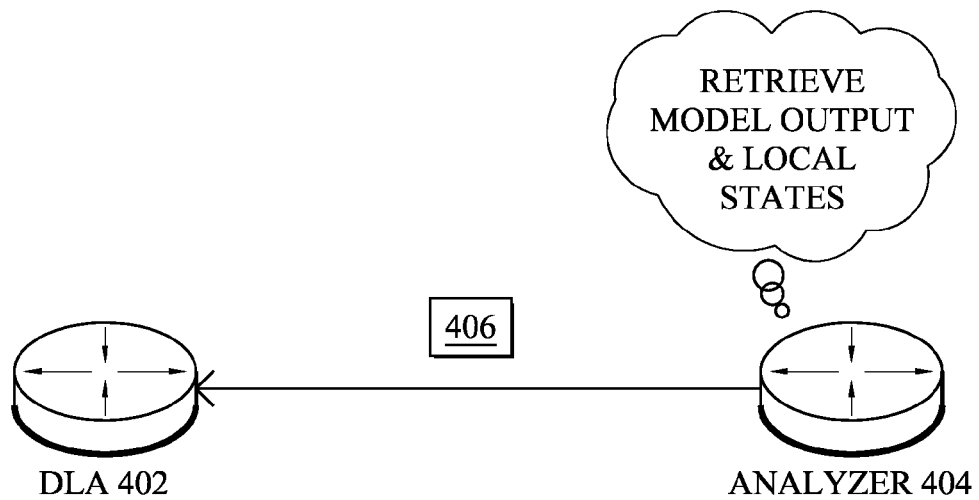
FIGS. 4A-4F illustrate examples of the use of state information to confirm an output of an anomaly detection model.

In further embodiments, the analysis of the detector output and/or the state information may be performed by a separate device than that of the DLA. For example, as shown in FIG. 4A, an analyzer 404 may communicate with a DLA 402, to assess the outputs of the anomaly detector executed by DLA 402. Thus, according to various embodiments, the DLA itself may be operable to analyze the output of its own anomaly detector using state information that is local to the DLA, the DLA may analyze the detector output using state information retrieved from one or more other devices in the network, or, in further cases, another device in the network may perform the analysis of the output (e.g., an SCA, other server, etc.).

In cases in which the state information used to assess the output of the anomaly detector is not local to the device performing the analysis, the analysis device may request the output of the anomaly detection model and/or any state information surrounding the output. For example, as shown in FIG. 4A, analyzer 404 may send a message 406 to DLA 402 or to any other device in the network that hosts this information. In some embodiments, message 406 may be a custom IPv4 or IPv6 message called Net_State( ) operable to retrieve the output of the anomaly detection model and/or the state information surrounding the output.

In some embodiments, message 406 may include any or all of the following type-length-values (TLVs) that identify:

1.) the model/detector for which the output is to be analyzed,

2.) the state information of interest and/or any other supporting parameters,

3.) the mode of operation for the reporting (e.g., to specify that the requested information be provided periodically, in an unsolicited manner, in response to an explicit request for the information, etc.), or 4.) a time period for the requested information (e.g., to request historical state information over the past n-number of minutes, to perform correlations over time between the detector output and the state information, etc.).

The information requested by message 406 may be of different natures, depending on the type of anomaly being detected, the topology of the network, or other such factors. In some embodiments, message 406 may request information regarding a set of traffic flows that match a specified rule. For example, such a rule may uniquely identify the set of flows (e.g., source/destination subnets, DSCP, traffic type identified by the UDP/TCP port, MPLS label, MAC address, etc.). In such a case, the states of interest may be the volume of traffic matching the specified rule or rules, the level of congestion of link utilization for which the flows match the rule, queue state information regarding the matching flows, or the like. In another embodiment, the states of interest may correspond to one or more QoS metrics for the matching traffic flows. Indeed, when supported on the networking devices, feature sets such as computed flow metrics (e.g., jitter, delays, etc.) or application-specific metrics such as a mean opinion score for voice or video traffic, may be requested by message 406.

In another example, message 406 may request state information regarding a specific network link or set of links. For example, message 406 may request data regarding the congestion level associated with the link or set of links, the availability of the link or set of links, etc. Such information may also be requested for specific traffic flows, as described above (e.g., flows that match one or more specified rules).

In a further example, message 406 may request state information regarding the operating state of one or more networking device. For example, message 406 may request information regarding the available or used memory of a particular device, the CPU usage of the device, or the like. Notably, high resource utilization may be indicative of an attack on the device, such as attacks based on SNMP MIB retrieval, CoAP, decryptions, etc.

Figure 4B:
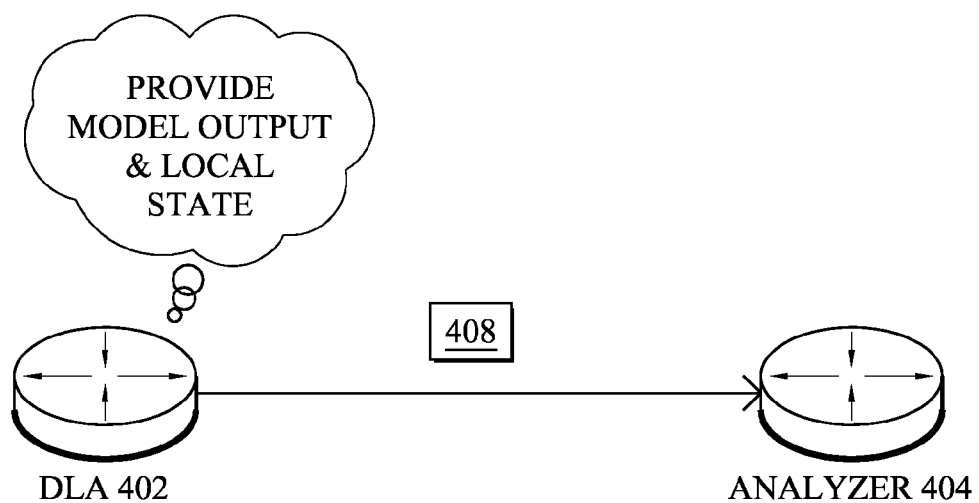

In response to receiving message 406, the receiving device may provide the requested information back to the requestor via a message 408, as shown in FIG. 4B. In some cases, DLA 402 or another device may provide state information via message 406 periodically (e.g., every n-number of minutes, hours, etc.), either on a push or pull basis. For example, message 406 may include information regarding the end-to-end delay experienced by a given application towards a specific server. Such information is extremely relevant when trying to assess the presence of a DDoS attack. In another example, message 408 may include information regarding historical congestion states for a given link. This information may be relevant, for example, when a volumetric DDoS attack is suspected for a given application (e.g., DNS amplification, etc.).

Figure 4C:
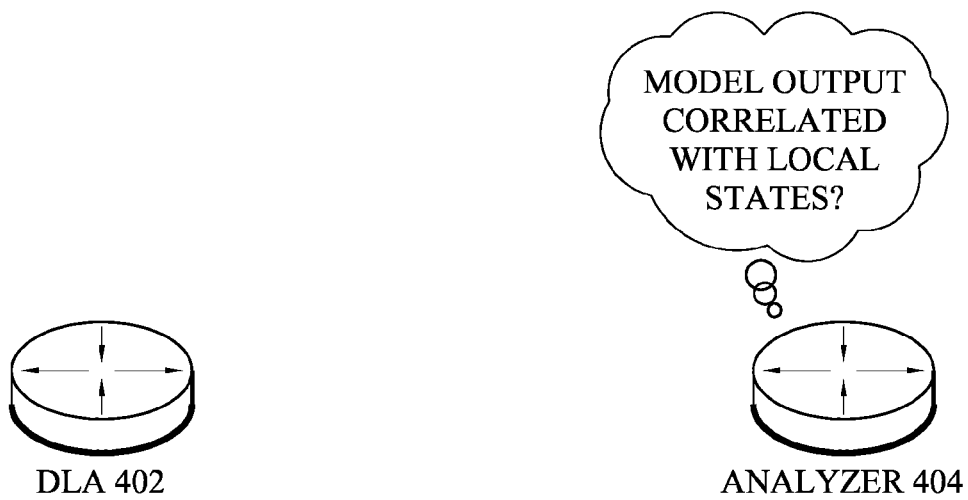

According to various embodiments, the analyzing device may correlate the output of the machine learning-based anomaly detector with the retrieved state information. For example, as shown in FIG. 4C, analyzer 404 may determine whether the state information retrieved from DLA 402 supports the output of the anomaly detector executed by DLA 402. As noted previously, the functions of analyzer 404 may be performed by a separate device as that of DLA 402 or integrated wholly or partially therewith, in various implementations.

Notably, if the anomaly detection model uses supervised learning (e.g., an ANN classifier, etc.), the output classes of the model may correspond to specific network behaviors that are known a priori (e.g., the model may indicate generally a set of labels applied to a specific recognized network behavior). Thus, prior knowledge such as expected network behavior for a certain condition can be leveraged to improve the efficacy of the model's output. In other words, information regarding the actual network state can be coupled to the output of the anomaly detector (e.g., via a softmax function for a given output neuron of an ANN, etc.), to evaluate the performance of the detector, to improve the performance of the detector, to associate a severity with a detected anomaly, etc.

In some cases, if the output of the anomaly detector (e.g., from an output neuron of an ANN, etc.) relates to a type of anomaly that can be characterized by a networking state, the analysis device may compare the state information with the output of the detector, to assess the performance of the detector. For example, if an ANN-based anomaly detector is used, the output of the ANN may be compared with the actual network state, to determine the recall and/or precision (e.g., efficacy) of the ANN.

Figure 4D:

In some cases, the retrieved state information may be compared to the output of the anomaly detector, to determine whether the output is a false positive. For example, as shown in FIG. 4D, analyzer 404 may determine that a particular output of the anomaly detection model executed by DLA 402 was a false positive, based on the state information received via message 408. More specifically, consider an example in which the anomaly detector of DLA 402 is configured to detect flooding attacks with potential amplification, such as DNS reflection. In such an attack, a drastic increase in DNS traffic would also be expected, potentially leading to a link congestion state in the network. If the aggregated state for DNS traffic and/or the link utilization state in the network does not support a "DNS Amplification" output label from the anomaly detector, then analyzer 404 may determine that the output of the detector was a false positive. In another example, a Slow Loris attack would also be expected to cause the response time of a targeted server to increase. In such a case, analyzer 404 may determine whether a Slow Loris attack detected by DLA 402 was a false positive by retrieving and analyzing the corresponding state information associated with the targeted server. For example, the state information regarding the response time of the server may be determined by actively probing the path to the server, based on administrative reporting tools built into the network, or the like.

Figure 4E:

The output of an anomaly detector may also be coupled to state information, to determine whether the output result was a false negative. For example, as shown in FIG. 4E, analyzer 404 may determine that a result of DLA 402 was a false negative based on an analysis of the state information received via message 408. Notably, assume that analyzer 404 receives state information that indicates that a particular link in the network has become congested due to flooded traffic, which can be determined by aggregating a series of link states and compared to one or more thresholds. In such a case, this congestion may strongly indicate that a flooding DDoS attack is underway in the network. However, if the output of the anomaly detector of DLA 402 does not indicate that a DDoS attack was detected, analyzer 404 may determine that the output of the anomaly detector was a false negative.

Figure 4F:
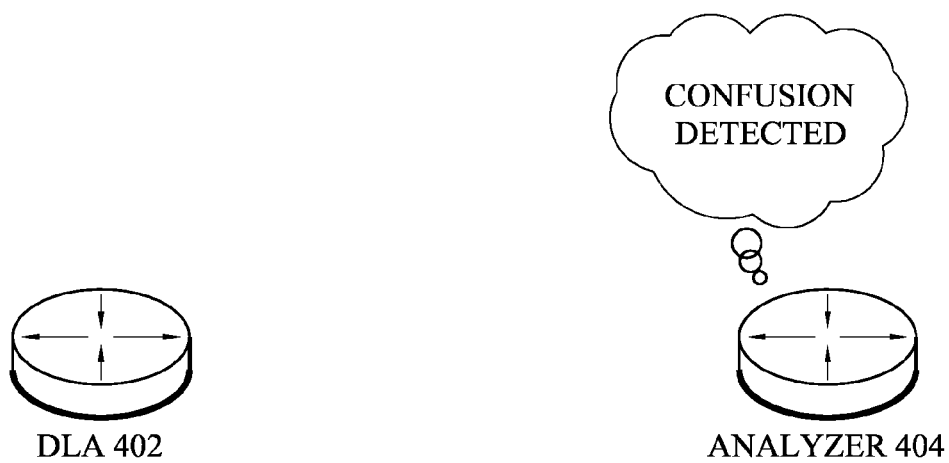

Coupling detector outputs with state information may also be used to detect model confusion, as shown in FIG. 4F. Indeed, it is not infrequent for an ANN to get potentially confused about an outcome (e.g. neuron X fires up instead of a neuron Y). By observing the network states along with the neuron output, this allows for the detection of such levels of confusion within the anomaly detection model.

In some cases, the comparison and analysis mechanism described above may itself trigger the sending of a Net_State( ) message based on the output of the anomaly detector. For example, analyzer 404 may request certain state information in response to the anomaly detector of DLA 402 indicating that a particular anomaly was detected, etc. In further cases, a more systematic approach may be taken whereby analyzer 404 polls DLA 402 or any other network device for the state information upon expiration of a configurable timer. In a further case, DLA 402 may push such information to analyzer 404 automatically, without first receiving a request for the information.

Referring now to FIGS. 5A-5E, examples are shown of an anomaly detection model being retrained. In some aspects of the techniques herein, an anomaly detection model may be retrained using the output of the model and the corresponding state information from the network.

Figure 5A:
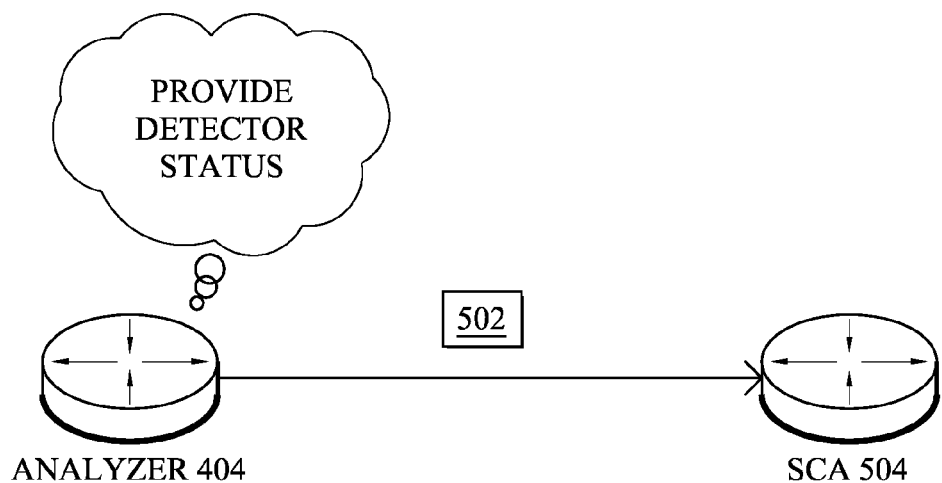
FIGS. 5A-5E illustrate examples of an anomaly detection model being retrained.

In some embodiments, as shown in FIG. 5A, analyzer 404 may provide a message 502 that includes feedback on the performance of the anomaly detector to a centralized agent (e.g., SCA 504, etc.). For example, analyzer 404 may compare the output of the anomaly detector to the received state information, determine whether the state information supports the output of the anomaly detector, and notify SCA 504 of the results of the analysis via message 502. In some cases, message 502 may be a custom IPv4 or IPv6 message called Detector_Status( ) that conveys the results of the analysis to the centralized device.

Figure 5B:
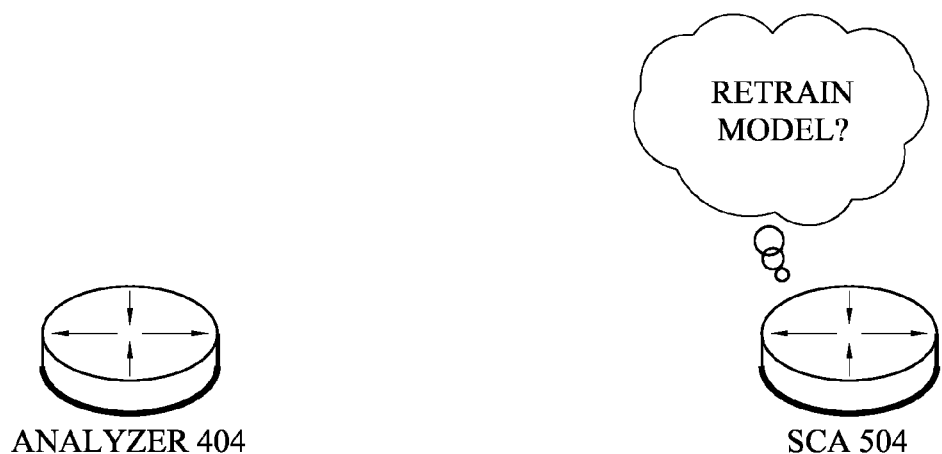
Figure 5C:
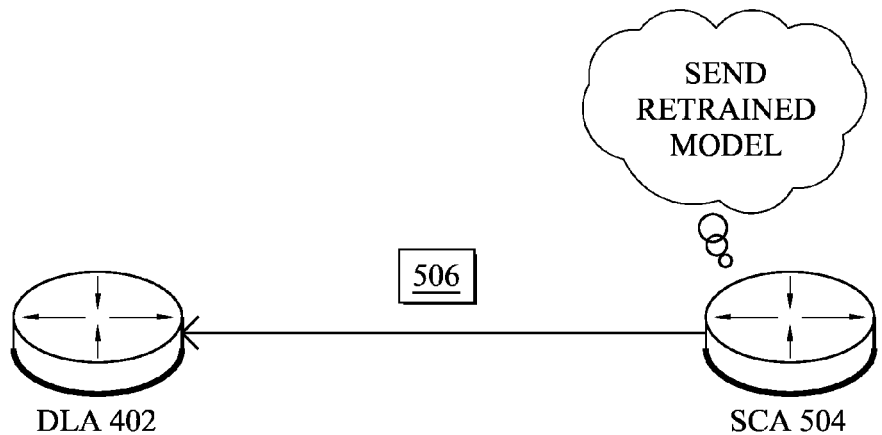

In response to receiving the results of the analysis of the detector or, alternatively, determining the results locally, the centralized device may determine whether the anomaly detection model should be retrained (e.g., to improve the level of recall, precision, or confusion of the model). For example, as shown in FIG. 5B, SCA 504 may determine whether or not the detection model of DLA 402 should be retrained based on the received Detector_Status( ) message 502, which may include the network state information, detector output values, or any other information that may be used to retrain the model. In some cases, SCA 504 may also retrieve additional aggregated flow information or raw packets, to retrain (e.g., re-compute) the detector model. As shown in FIG. 5C, if SCA 504 determines that the anomaly detection model should be retrained, SCA 504 may perform the retraining and provide the retrained model back to DLA 402 via a message 506.

Figure 5D:
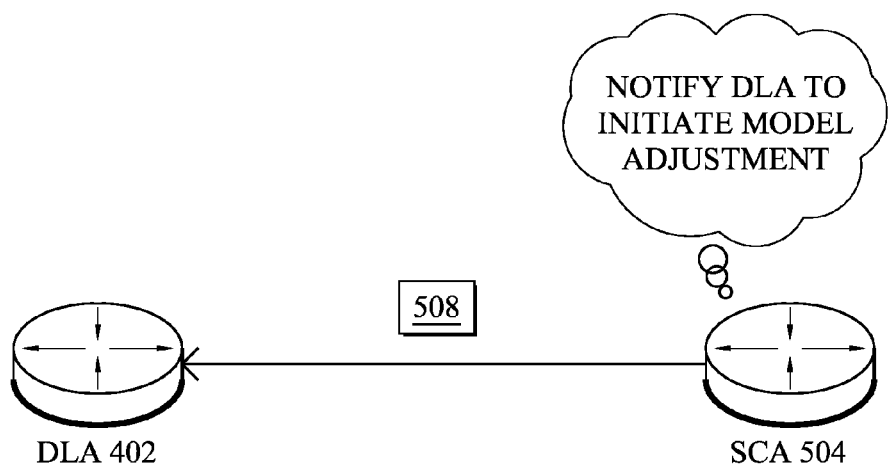
Figure 5E:

In other embodiments, the detector may be retrained or otherwise adjusted at the edge/DLA. For example, as shown in FIG. 5D, SCA 504 may send a notification 508 to DLA 402 to inform DLA 402 that the anomaly detection model should be adjusted. In turn, as shown in FIG. 5E, DLA 402 may adjust its anomaly detection model to account for the inaccuracy of its detector output(s). For example, the edge device/DLA may use incremental learning to update the model. In another example, DLA 402 may restart the training process from scratch. However, doing so may be prohibitively expensive to perform at the network edge, in some cases.

Figure 6A:
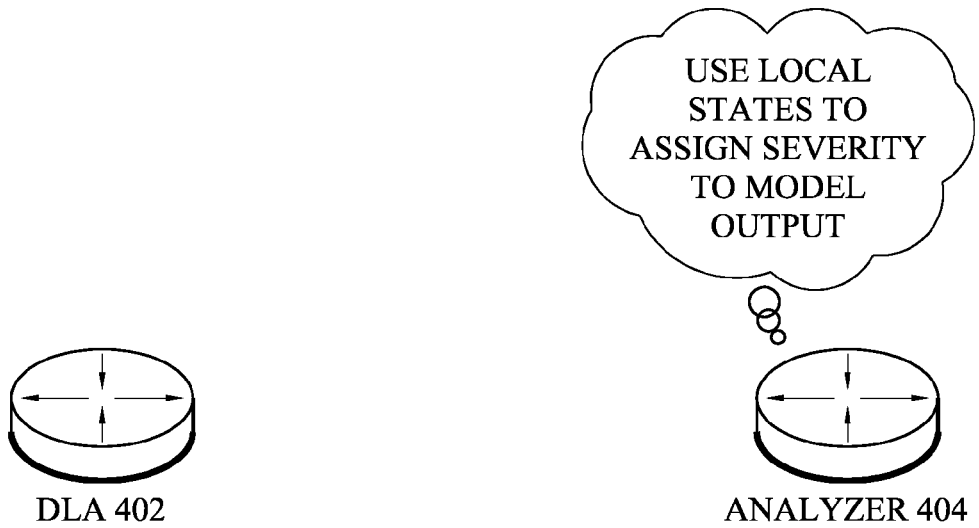
FIGS. 6A-6B illustrate examples of a severity being determined for an output of an anomaly detection model.
Figure 6B:
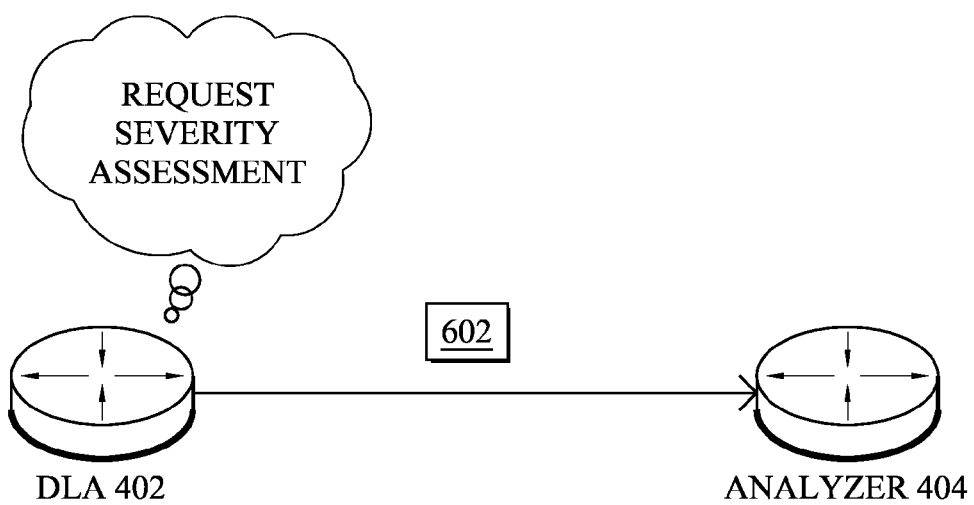

Referring now to FIGS. 6A-6B, examples are shown of a severity being determined for an output of an anomaly detection model. According to various embodiments, the network state information coupled with an anomaly detector output may be used to determine a severity for the output.

Notably, many anomaly detection systems that use machine learning also make use of anomaly characteristics comprising a number of parameters that are flagged using a score, potentially along with severity. The score usually refers to the degree of the anomaly (e.g., "by how much does the anomaly deviates from the expected modeled behavior"), whereas the severity is used to qualify the potential consequences of the detected anomaly. However, determining proper metrics for both scores and severity is extremely complex and challenging. Determining a severity for a detected anomaly is of particular interest, since this determination may drive reporting (e.g., to a network administrator).

To determine a score and/or severity for a detected anomaly, many systems rely on the model itself and/or manual flagging of the anomaly using static rules. For example, an anomaly may be scored based on the residual values of the anomaly detection model. However, severity cannot be similarly derived from the model itself.

In various embodiments, the local state information used to assess the output of the detector may also be used to determine the severity of the output. For example, as shown in FIG. 6A, analyzer 404 may use the retrieved state information form the network to assign a severity to the output of the anomaly detection model executed by DLA 402.

Various approaches can be taken in order to assign a severity to a model output. In a first embodiment, a policy-based approach may be used whereby the various network state metrics are compared to one or more threshold. For example, if the link congestion level occurring during a detected flooding attack crosses one or more configurable thresholds, then the severity of the detected anomaly may be adjusted accordingly. Note that the severity may not be a function of a single variable. For example, the network administrator may elect to use a severity rule that takes into account the link level of congestion and the queue state. Indeed, a DDoS flooding attack may lead to congestion on a particular link, while still not affecting the QoS of high priority traffic. In such a case, a lower severity may be assigned to the detected attack, since the high priority traffic was not affected.

In a yet further embodiments, user feedback may be used to adjust the severity assignment rules. For example, as shown in FIG. 6B, DLA 402 (or another device assigning a severity to the output of the detector) may send a request 602 to analyzer 404 or another device, for assessment by a network administrator. In some embodiments, request 602 may be a custom IPv4 or IPv6 unicast message called Sev_Assess( ) that reports the detected anomaly and includes the required characterization parameters and network state information. In turn, analyzer 404 may provide the information in request 602 to a user interface, for assessment by a network administrator. In some embodiments, the system may use the administrator-supplied severity to train a severity assessment model, allowing for automatic severity assessment in the future.

Figure 7:
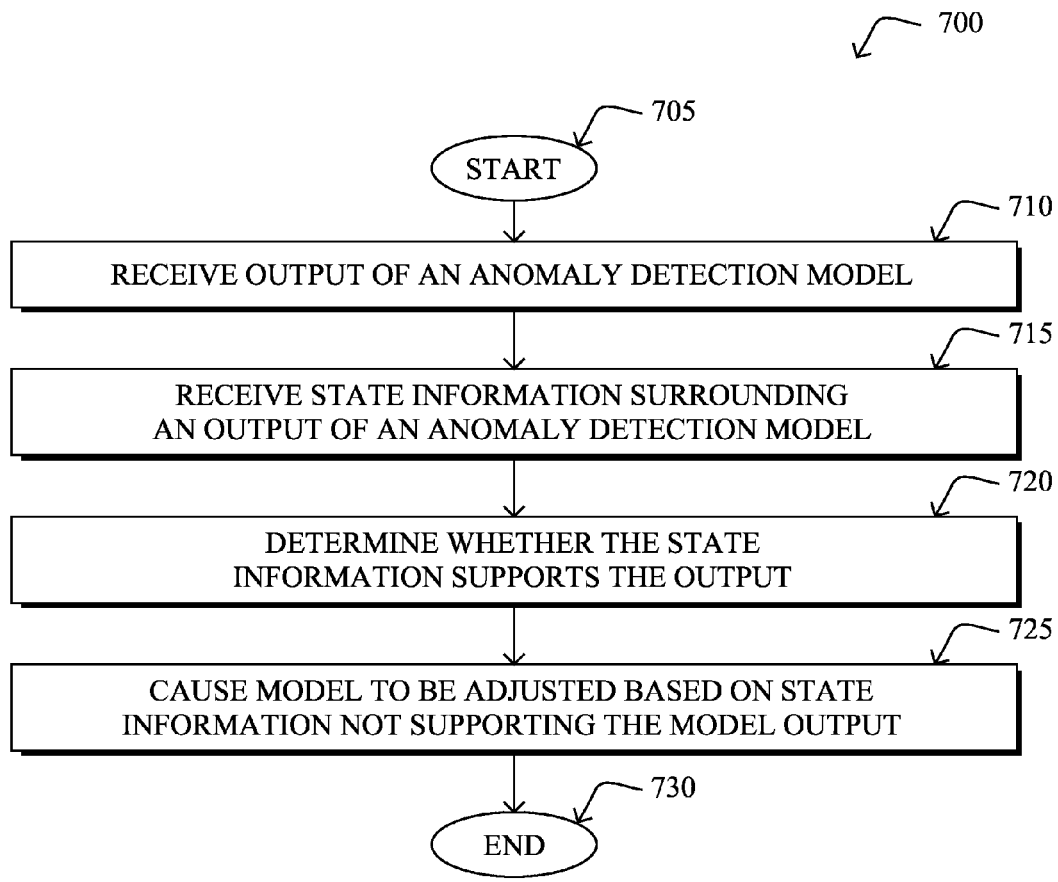
FIG. 7 illustrates an example simplified procedure for coupling state information with an output of a machine learning model.

FIG. 7 illustrates an example simplified procedure for coupling state information with an output of a machine learning model, in accordance with one or more embodiments described herein. The procedure 700 may start at step 705, and continues to step 710, where, as described in greater detail above, a device in a network may receive an output of an anomaly detection model. In some embodiments, the device may receive the output from a local anomaly detector (e.g., the device itself may be a DLA). In other embodiments, the device may receive the output from a DLA deployed in the network, either on a push or pull basis (e.g., the DLA may send the output to the device in response to a request for the output, periodically, or based on the output). The output may, in some cases, be a label/classification applied by the anomaly detection model to aggregated traffic flow data from the network (e.g., "normal behavior," "DDoS attack detected," etc.).

At step 715, as detailed above, the device may receive state information surrounding the output of the anomaly detection model. Generally, the state information may be any state information that can be used to corroborate the output of the anomaly detection model received in step 710. For example, the state information may be for a particular link, path, traffic flow, type of traffic, or device in the network. In some embodiments, the state information may be, but is not limited to, any information indicative of congestion in the network along a particular path or link, a response time of a server or other device, a QoS traffic metric, device system metrics (e.g., queue states, memory usage, CPU usage, etc.), combinations thereof, or the like. In some embodiments, the device may request the state information based on the output of the anomaly detection model.

At step 720, the device may determine whether the state information supports the output of the anomaly detection model, as described in greater detail above. In various embodiments, the device may determine whether the output was a false positive, false negative, or the result of model confusion. For example, the device may determine whether actual congestion has occurred in the network, if the model detects a particular type of DoS attack. In another example, the device may analyze the state information to determine whether an attack or other anomaly may be present, despite the model labeling the behavior of the network as "normal."

At step 725, as detailed above, the device may cause the model to be adjusted based on a determination that a determination that the state information does not support the output of the anomaly detection model. In some embodiments, such as if the device is a supervisory learning agent, the device may cause the model to be adjusted by retraining the model (e.g., by applying the correct label to the inputs of the model) or instructing another device to do so (e.g., the DLA hosting the model, etc.). In another embodiment, the device may cause the model to be adjusted by causing the model to be adjusted using incremental learning, instead of performing a complete retraining of the model. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allows for the overall efficacy of an anomaly detection mechanism to be improved using network state information. In particular, the techniques herein allow for the detection of false positives, false negatives, and the like, based on an analysis of the state information surrounding the output of an anomaly detection model (e.g., a classifier ANN, etc.). In some cases, the model may be retrained or otherwise adjusted, in the presence of model confusion. Further, the techniques herein also allow for the computation of a severity associated with the output of the model according to the actual observed state of the network and/or network devices.

While there have been shown and described illustrative embodiments that provide for the coupling of state information with machine learning outputs, it is to be understood that various other adaptations and modifications may be made within the spirit and scope of the embodiments herein. For example, the embodiments have been shown and described herein with relation to certain network topologies. However, the embodiments in their broader sense are not as limited, and may, in fact, be used with other types of shared-media networks, network configurations, and/or protocols (e.g., wireless). In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a device in a network, an output of an anomaly detection model produced by a machine learning algorithm, wherein the anomaly detection model detects anomalies in network traffic behavior;
    retrieving, by the device, state information surrounding the output of the anomaly detection model, wherein the state information is information about the network retrieved from one or more devices in the network;
    correlating, by the device, the retrieved state information with the output of the anomaly detection model produced by the machine learning algorithm;
    based on the correlation, determining, by the device, whether the state information supports the output of the anomaly detection model to assess a performance of the anomaly detection model output, wherein the state information comprises information that was not used as input to the anomaly detection model;
    detecting, by the device, a false positive in the anomaly detection model output based on the retrieved state information not supporting the anomaly detection output; and
    dynamically retraining the anomaly detection model, by the device, to adjust the anomaly detection model produced by the machine learning algorithm when the false positive is detected.

2. The method as in claim 1, wherein the state information comprises at least one of: information indicative of congestion in the network or a measured quality of service (QoS) metric.

3. The method as in claim 1, wherein the state information comprises at least one of: system metrics of a particular node in the network or link metrics of a particular set of one or more links in the network.

4. The method as in claim 1, wherein receiving the state information surrounding the output of the anomaly detection model comprises:
    sending, by the device, a request to a node in the network for the state information, wherein the request is generated based on a type of the anomaly detection model.

5. The method as in claim 1, wherein receiving the state information surrounding the output of the anomaly detection model comprises:
    retrieving the state information from a local memory of the device.

6. The method as in claim 1, further comprising:
    determining, by the device, a severity associated with the output of the anomaly detection model based on the state information.

7. The method as in claim 6, wherein determining the severity associated with the output of the anomaly detection model comprises:
    comparing, by the device, the state information to one or more threshold values.

8. The method as in claim 6, wherein determining the severity associated with the output of the anomaly detection model comprises:
    providing, by the device, the output of the anomaly detection model and the state information to a user interface; and
    receiving, via the user interface, data indicative of the severity.

9. The method as in claim 1, wherein causing the anomaly detection model to be adjusted comprises:
    updating, locally at the device, the anomaly detection model using incremental learning.

10. An apparatus, comprising:
    one or more network interfaces to communicate with a network;
    a processor coupled to the network interfaces and adapted to execute one or more processes; and
    a memory configured to store a process executable by the processor, the process when executed configured to:
    receive an output of an anomaly detection model produced by a machine learning algorithm, wherein the anomaly detection model detects anomalies in network traffic behavior;
    retrieve state information surrounding the output of the anomaly detection model, wherein the state information is information about the network retrieved from one or more devices in the network;
    correlate the retrieved state information with the output of the anomaly detection model produced by the machine learning algorithm;
    based on the correlation, determine whether the state information supports the output of the anomaly detection model to assess a performance of the anomaly detection model output, wherein the state information comprises information that was not used as input to the anomaly detection model;
    detect a false positive in the anomaly detection model output based on the retrieved state information not supporting the anomaly detection output; and
    dynamically retraining the anomaly detection model to adjust the anomaly detection model produced by the machine learning algorithm when the false positive is detected.

11. The apparatus as in claim 10, wherein the state information comprises at least one of: information indicative of congestion in the network or a measured quality of service (QoS) metric.

12. The apparatus as in claim 10, wherein the state information comprises at least one of: system metrics of a particular node in the network or link metrics of a particular set of one or more links in the network.

13. The apparatus as in claim 10, wherein the apparatus receives the state information surrounding the output of the anomaly detection model by sending, a request to a node in the network for the state information, wherein the request is generated based on a type of the anomaly detection model.

14. The apparatus as in claim 10, wherein the apparatus receives the state information surrounding the output of the anomaly detection model by retrieving the state information from a local memory of the device.

15. The apparatus as in claim 10, wherein the process when executed is further configured to:
determine a severity associated with the output of the anomaly detection model based on the state information.

16. The apparatus as in claim 15, wherein the apparatus determines the severity associated with the output of the anomaly detection model by comparing the state information to one or more threshold values.

17. The apparatus as in claim 15, wherein the apparatus determines the severity associated with the output of the anomaly detection model by:
providing the output of the anomaly detection model and the state information to a user interface; and
receiving, via the user interface, data indicative of the severity.

18. The apparatus as in claim 10, wherein the apparatus causes the anomaly detection model to be adjusted by retraining the anomaly detection model locally using incremental learning.

19. A tangible, non-transitory, computer-readable media having software encoded thereon, the software when executed by a processor of a device configured to:
receive an output of an anomaly detection model produced by a machine learning algorithm, wherein the anomaly detection model detects anomalies in network traffic behavior;
retrieve state information surrounding the output of the anomaly detection model, wherein the state information is information about the network retrieved from one or more devices in the network;
correlate the retrieved state information with the output of the anomaly detection model produced by the machine learning algorithm;
based on the correlation, determine whether the state information supports the output of the anomaly detection model to assess a performance of the anomaly detection model output, wherein the state information comprises information that was not used as input to the anomaly detection model;
detect a false positive in the anomaly detection model output based on the retrieved state information not supporting the anomaly detection output; and
dynamically retraining the anomaly detection model to adjust the anomaly detection model produced by the machine learning algorithm when the false positive is detected.

* * * * *